US007121683B2

(12) United States Patent
Teng et al.

(10) Patent No.: US 7,121,683 B2
(45) Date of Patent: Oct. 17, 2006

(54) DIRECT BACKLIGHT MODULE

(75) Inventors: Yu-Yuan Teng, Kaohsiung (TW); Hsin-Wu Lin, Tainan (TW)

(73) Assignee: AU Optronics Corp., Hsinchu (TW)

( * ) Notice: Subject to any disclaimer, the term of this patent is extended or adjusted under 35 U.S.C. 154(b) by 117 days.

(21) Appl. No.: 10/820,740

(22) Filed: Apr. 9, 2004

(65) Prior Publication Data

US 2005/0174766 A1 Aug. 11, 2005

(30) Foreign Application Priority Data

Feb. 6, 2004 (TW) ............................... 93102788 A

(51) Int. Cl.
*F21S 4/00* (2006.01)
*F21V 5/00* (2006.01)
*F21V 17/00* (2006.01)
*G02F 1/1335* (2006.01)

(52) U.S. Cl. ...................... 362/225; 362/330; 362/331; 362/456

(58) Field of Classification Search .................. 362/29, 362/225, 330, 331, 358, 456, 561
See application file for complete search history.

(56) References Cited

U.S. PATENT DOCUMENTS 3,408,491 A * 10/1968 George ....................... 362/290
3,885,150 A * 5/1975 Ott .............................. 362/290
4,150,422 A * 4/1979 Peralta et al. ............... 362/218
6,341,879 B1 * 1/2002 Skinner et al. ............. 362/225
2004/0105044 A1 * 6/2004 You ............................ 349/58
2004/0114372 A1 * 6/2004 Han et al. ..................... 349/59

FOREIGN PATENT DOCUMENTS

JP 7-37146 4/1991
JP 10-177456 6/1998

* cited by examiner

*Primary Examiner*—Alan Cariaso
(74) *Attorney, Agent, or Firm*—Troxell Law Office, PLLC

(57) ABSTRACT

A direct backlight module for an LCD panel includes a base, a supporter plate and a plurality of films. The base further has a plurality of lamps parallel arranged thereinside. The supporter plate is mounted over the base and further has a frame and a plurality of wires. The frame is a square structure having a central opening, and each of the wires is constructed at the frame by crossing the central opening. The films are mounted layer by layer over the supporter plate and born by both the frame and the wires. The module can engage with an LCD at a side exposing the film and, under such an engagement, lights of the lamps can pass through the central opening of the supporter plate, penetrate the films, and finally reach the LCD.

8 Claims, 3 Drawing Sheets

DIRECT BACKLIGHT MODULE

BACKGROUND OF THE INVENTION (1) Field of the Invention

The invention relates to a direct backlight module, and more particularly to a backlight module that can provide a backlight source to a liquid crystal display.

(2) Description of the Prior Art

With rapid development of thin film transistor (TFT) technology, especially in light weight, energy saving and non-radiation features, the liquid crystal display (LCD) has been widely used in various electronic devices such as personal digital assistants (PDA), notebook computers, digital cameras, slim televisions, mobile phones, and so on. In contrast to conventional cathode radiation devices, the liquid crystal display is benefited from a light source of a backlight module to make clear the information tossed to the display.

Referring to FIG. 1A and FIG. 1B, an exploded view of a typical LCD panel including a conventional direct backlight module and a cross-sectional view of the conventional direct backlight module are shown, respectively. As illustrated, the backlight module 1 located under an LCD 2 includes a base 10, a diffuser plate 11 and a plurality of films 12. In the base 10, a plurality of parallel lamps 13 are mounted. In the space formed between the lamps 13 and the interior bottom of the base 1, a common reflection plate 14 for reflection lights of the lamps 13 is included. The diffuser plate 11 located over the lamps 13 is typically a white light-permeable acrylic or polycarbonate plate to diffuse and so homogenize the lights provided by the lamps 13. The films 12 including multiple sheets and layered on the diffuser plate 11 are introduced to perform specific optical purposes. For example, the prism sheet is used to cluster lights, and the brightness-enhancement sheet is used to enhance the brightness of the LCD 2. Further, the films 12 can also have a diffuser sheet. In practice, the determination upon layers and sorts of the films 12 for a particular LCD panel is a designer option.

Ideally, the lights generated by the lamps 13 after passing the diffuser plate 11 and the films 12 are homogenized and thus can serve as a perfect backlight source to the LCD 2.

Also shown in FIG. 1A, the LCD 2 is mounted over the films 12 of the base 1. A bezel 3 is further mounted on top of the LCD 2 and engaged with the base 10 to complete the assembly of the LCD panel.

Nevertheless, the conventional direct backlight module 1 described above still has the following disadvantages.

a. The weight of the conventional backlight module is a negative factor to the LCD panel. As known, the diffuser plate in the art is usually made of acrylic, PC or glass material with a 2-4 mm thickness. Such a thickness will definitely become an awkward design as the dimension of the LCD panel becomes larger and larger.

b. The acrylic material of the diffuser plate is vulnerable to deform after a substantial period of exposure time under the lamps, from which the backlight quality is easy to be distorted.

c. The PC board for the diffuser plate will be gradually yellowed by the UV ray from the lamps, and thereby the backlight quality will definitely influenced.

d. The overall thickness of the direct backlight module including the diffuser plate and the lamps is too big to make the LCD panel slimmer.

Therefore, a light-weight, thin and quality direct backlight module is always a topic to which the skill in the art is willing to devote.

SUMMARY OF THE INVENTION

Accordingly, it is a primary object of the present invention to provide a direct backlight module which has a better backlight source.

It is another object of the present invention to provide a light-weight direct backlight module.

It is a further object of the present invention to provide a slimmer direct backlight module.

The direct backlight module in accordance with the present invention for performing as a backlight source to the LCD panel includes a base, a supporter plate and a plurality of films.

In an interior of the base, a plurality of parallel lamps are mounted and a reflection plate for reflecting lights of the lamp is formed on at least one interior surface of the base.

The supporter plate includes a frame and a plurality of interior wires. The frame located above the base is consisted of four lateral sides and provides an opening to pass the light. Each of the wires is used to bridge two lateral sides over the opening. The arrangement of the wires can be a parallel pattern, a cross pattern or the like. In addition, the wire, made of a metal or a plastic, is preferred to be in a tension state in the frame.

The films are layered over and thus supported by the supporter plate. In assembling the LCD panel, the backlight module including, in order from top to bottom, the films, the supporter plate, the lamps, the reflection plate and the base as a compact module is engaged with the LCD and a bezel is further applied to the LCD for assuring the assembly of the LCD and the backlight module by matching with the base. Upon such an arrangement, lights of the lamps can pass the opening of the supporter plate and the films and finally reach the LCD.

In the present invention, the wire of the supporter plate preferably has a diameter below 0.5 mm. Compared to the diffuser plate in the conventional LCD panel, the supporter plate of the present invention formed by a frame and cross wires does provide a light-weight and slim alternative. For the direct backlight module does not have the diffuser plate, thus the problems in distortion and yellowness will never occur. In the present invention, one of the films can be a diffuser film with a predetermined haze rate to achieve a substantial degree of diffusing effect that is originally provided by the conventional diffuser plate.

All these objects are achieved by the direct backlight module described below.

BRIEF DESCRIPTION OF THE DRAWINGS

The present invention will now be specified with reference to its preferred embodiment illustrated in the drawings, in which.

DESCRIPTION OF THE PREFERRED EMBODIMENT

The invention disclosed herein is directed to a direct backlight module. In the following description, numerous details are set forth in order to provide a thorough understanding of the present invention. It will be appreciated by one skilled in the art that variations of these specific details are possible while still achieving the results of the present invention. In other instance, well-known components are not described in detail in order not to unnecessarily obscure the present invention.

Figure 2A:
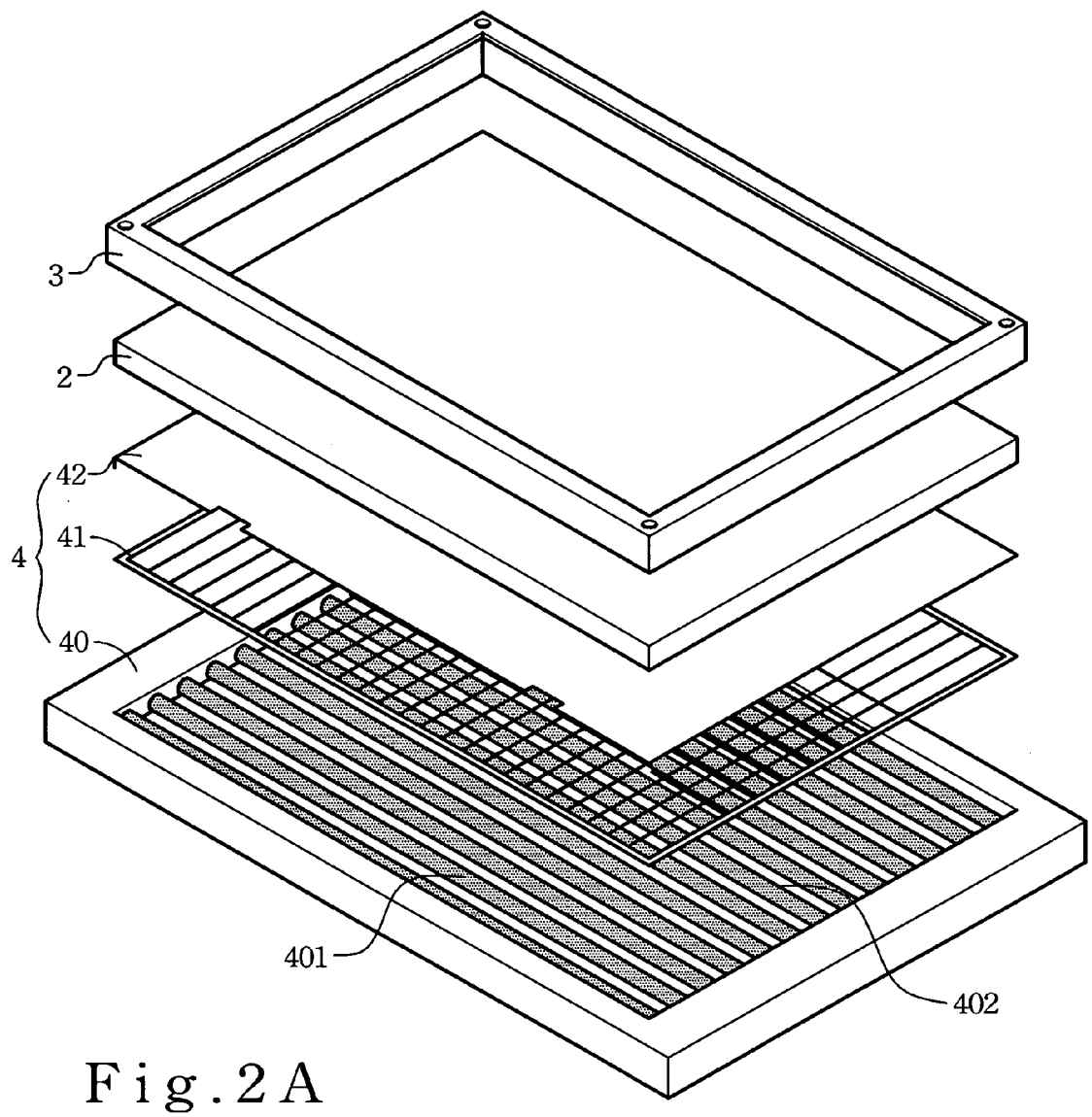
FIG. 2A is an exploded perspective view of an LCD panel with a preferred direct backlight module in accordance with the present invention.
Figure 2B:
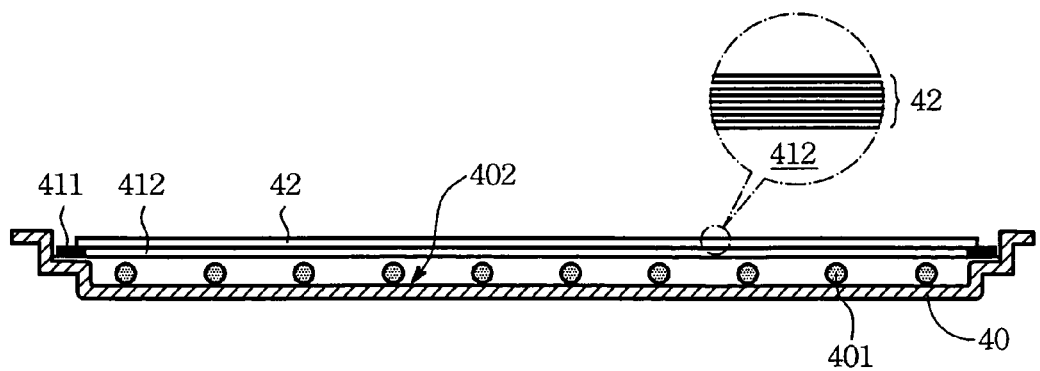
FIG. 2B is a cross-sectional view of the direct backlight module of FIG. 2A.

Referring now to FIG. 2A and FIG. 2B, an exploded view of a typical LCD panel with a preferred direct backlight module 4 of the present invention and a cross-sectional view of the preferred direct backlight module 4 are shown, respectively. As shown, the direct backlight module 4 for providing a backlight source is located under an LCD 2 and includes a base 40, a supporter plate 41 and a plurality of films 42.

The base 40 further includes interiorly a plurality of parallel lamps 401. The lamp 401 can be a Cold Cathode Fluorescent Lamp or the like. Also, at least a reflection plate 402 can be constructed between an interior bottom surface of the base 40 and the lamps 401 or formed on at least one interior surface of the base 40 so as to reflect lights of the lamps 401 and direct the reflected lights toward the LCD 2. Alternatively, the reflection plate 402 can be formed as a reflection material coated on the interior bottom surface of the base 40.

Figure 3:
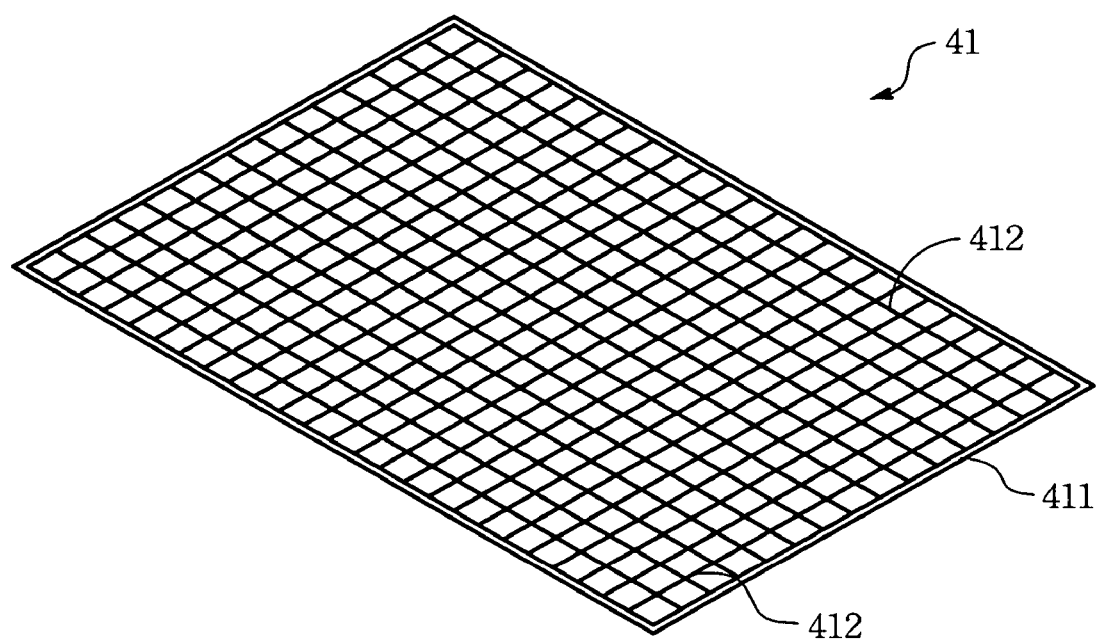
FIG. 3 is a perspective view of another preferred supporter plate in accordance with the present invention.

The supporter plate 41 placed upon the base 40 includes a frame 411 and a plurality of wires 412 constructed inside the frame 411. the frame 411 can be a square structure having a central opening to pass the lights. Each of the wires 412 is constructed to bridge any two lateral sides of the frame 411 and to cross the central opening of the frame 411. In the invention, the wires 412 can be arranged to be a parallel pattern as shown in FIG. 2A, a cross pattern as shown in FIG. 3, or any other proper pattern. Materials for the wires 411 can be metals, polymers or the like. The wire 411 is preferable to have a diameter less than 0.5 mm and is pre-tensed good to bear the films 42.

The films 42 of the present invention can include a prism film, a film to diffuse lights, a film to achieve a haze effect, a color-filtering film, a depolarizing film, or any other proper film to meet a design purpose. Those films 42 are stacked layer by layer over the supporter plate 41.

After the base 40 including the lamps 401 and the reflection plate 402, the supporter plate 41 and the films 42 are integrated to form a compact direct backlight module 4, the module 4 can then engage with the LCD 2 at a side exposing the film 42, and the engagement can then be ensured by having a bezel 3 to frame the LCD 2 and be fastened to the base 40. Upon such an arrangement, lights of the lamps 401 can pass through the central opening of the supporter plate 41, penetrate the films 42, and finally reach the LCD 2.

Figure 1A:
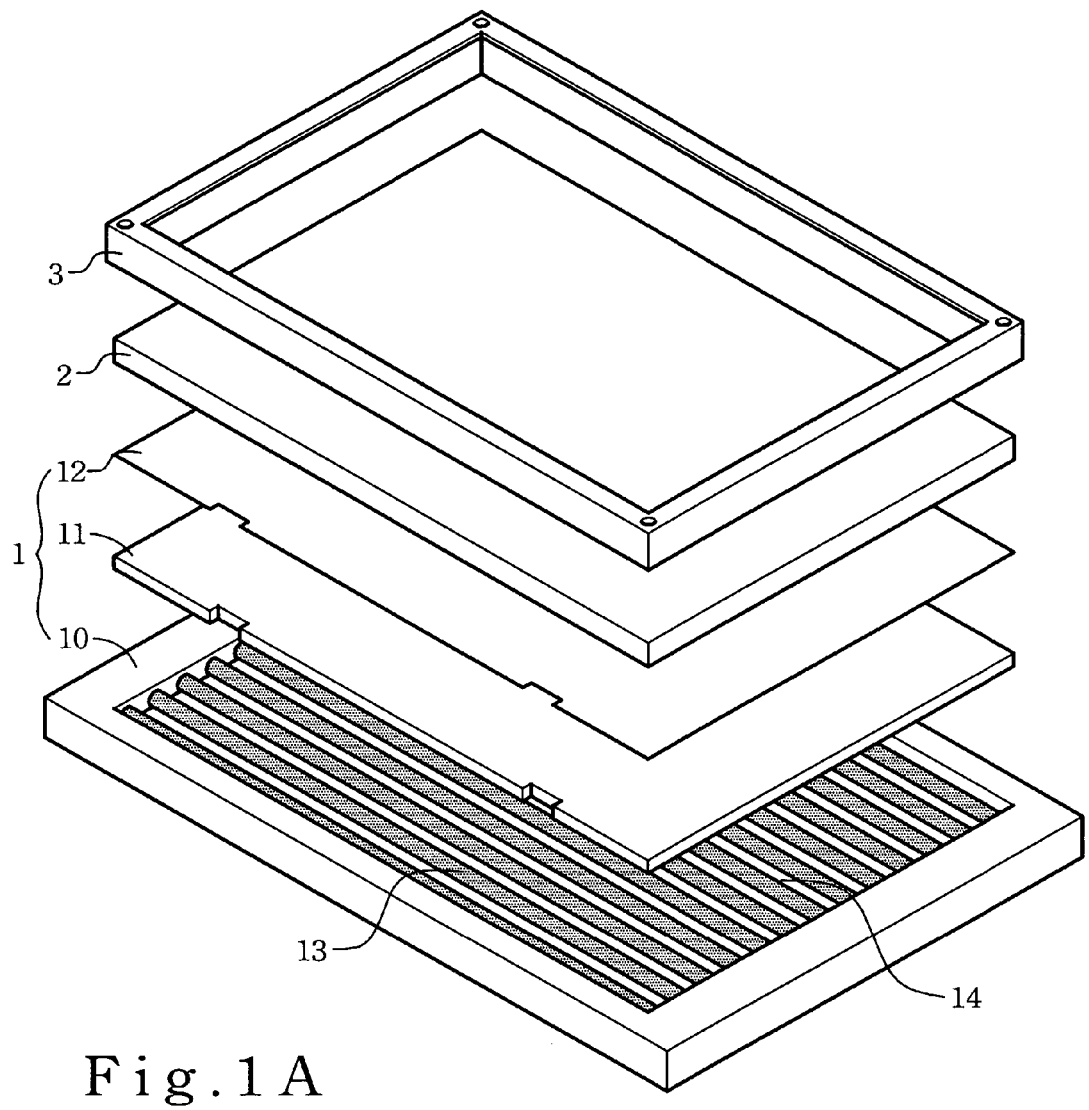
FIG. 1A is an exploded perspective view of a typical LCD panel with a conventional direct backlight module.
Figure 1B:
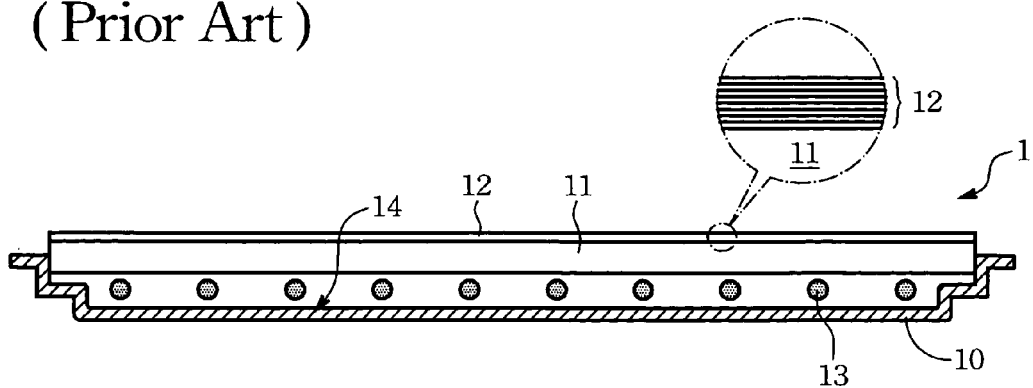
FIG. 1B is a cross-sectional view of the direct backlight module of FIG. 1A.

It should be noted again that the major effort of the present invention is to introduce the supporter plate 41 for bearing the films 42. Contrary to the conventional diffuser plate 11 shown in FIG. 1B, the supporter plate 41 of the present invention is more lightweight, contributed by the inclusion of the wires 412 having diameters less than 0.5 mm. As a result, the direct backlight module 4 of the present invention is much lighter.

By waiving the diffuser plate, the present invention won't encounter the distortion or yellowness problem. Nevertheless, though the light-diffusing performance in the present invention may be sacrificed to a substantial degree by ridding the diffuser plate, yet it can still be regained by adding a diffuser film with a predetermined haze rate to achieve a satisfied degree of diffusing effect. Thus, the image quality of the LCD in the present invention can be ensured.

While the present invention has been particularly shown and described with reference to a preferred embodiment, it will be understood by those skilled in the art that various changes in form and detail may be without departing from the spirit and scope of the present invention.

We claim:

1. A direct backlight module, comprising:
   a base, having a plurality of parallel-arranged lamps;
   a supporter plate, mounted over the base, further having a frame and a plurality of wires, in which the frame is a square structure having a central opening, in which each of the wires is constructed at the frame, crosses the central opening, and is made of polymer; and
   a plurality of films, mounted over and supported by the supporter plate.

2. The direct backlight module according to claim 1, wherein said lamp is a Cold Cathode Fluorescent Lamp.

3. The direct backlight module according to claim 1, wherein said wires are parallel arranged over said central opening of said supporter plate.

4. The direct backlight module according to claim 1, wherein said wires are cross arranged over said central opening of said supporter plate.

5. The direct backlight module according to claim 1, wherein said films include a film to diffuse lights of said lamps.

6. The direct backlight module according to claim 1, wherein said films include a film to achieve a haze effect.

7. The direct backlight module according to claim 1, wherein said base has at least an interior bottom surface thereof coated with a reflection material.

8. The direct backlight module according to claim 1, comprises a reflection plate formed on at least one interior surface of said base.

* * * * *